March 11, 1958  W. C. VAUGHN  2,826,426
PORTABLE CARRIER STORAGE TRUCK
Filed Oct. 6, 1953
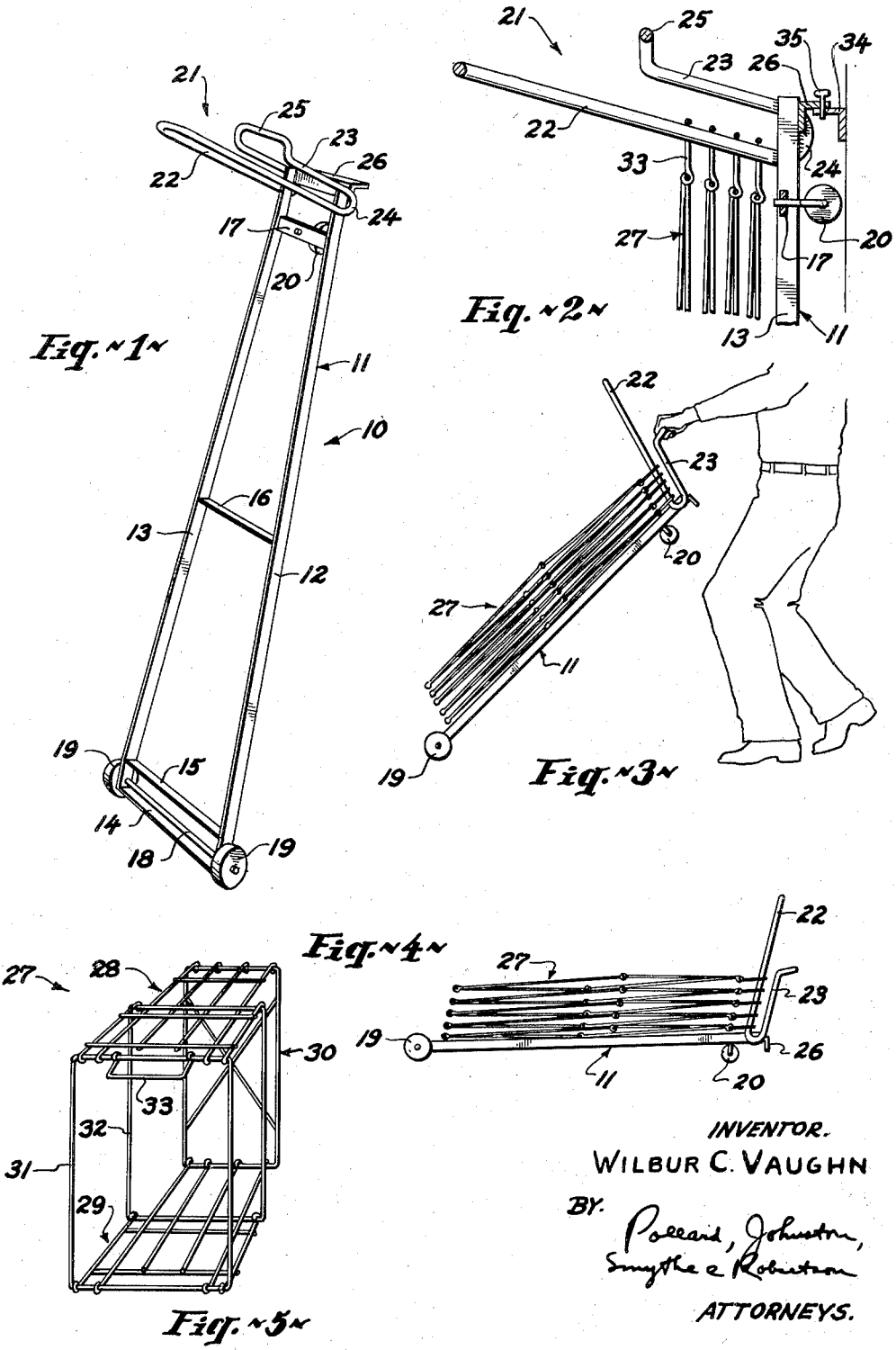
INVENTOR.
WILBUR C. VAUGHN
ATTORNEYS.

United States Patent Office 2,826,426
Patented Mar. 11, 1958

2,826,426

PORTABLE CARRIER STORAGE TRUCK

Wilbur C. Vaughn, Berwick, Pa.

Application October 6, 1953, Serial No. 384,378

4 Claims. (Cl. 280—47.2)

This invention relates generally to a portable truck, and is particularly directed to a portable truck for use in storing and transporting collapsible carriers employed in the distribution and handling of bulky or easily crushed products or fragile articles, for example, bakery products such as loaves of bread, pies, packaged rolls, or other soft goods.

In a co-pending application, Serial No. 297,627, filed July 8, 1952, now Patent No. 2,765,111, I have disclosed a system and apparatus for handling and transporting articles such as tubular receptacles for loaves or other fragile or bulky products, by which the articles are stored and transported in easily portable stacks to simplify their distribution and eliminate or greatly reduce the likelihood of damage to the products held in them in the course of their distribution to purchasers, and the manual operations involved in collecting together and transporting such articles are reduced by eliminating all need for individual handling of the products or of receptacles used to hold them before they reach purchasers, thus increasing the efficiency and reducing the expense of distribution. This system, which is more completely described in the above identified application, makes use of collapsible tubular receptacles to receive and protect single layers of the articles as they are slid into the receptacles, for example, from wrapping machines, and these receptacles are held securely and transported in stacks by means of collapsing portable carriers which receive the receptacles through open ends and confine them against lateral displacements so that the receptacles of a stack in each carrier support one another in open condition without any freedom to collapse; and the carriers furthermore are constructed so that each carrier holding a stack of receptacles can be easily lifted and carried with one hand without danger of spilling products in the receptacles and can be stacked with other similarly loaded carriers for very efficient storage and conveyance at production plants and/or on delivery trucks or the like.

After the articles, such as, bread loaves, pies, packaged rolls, or other soft goods, have been delivered to the food markets, restaurants or other places where they are to be consumed or resold, the emptied carriers are collapsed by the delivery man for return to the bakery where they are to be reloaded with tubular receptacles containing single layers of the articles. Thus, as the delivery truck travels its appointed route, the carriers stored therein are successively removed and emptied and then collapsed and returned to the truck for transport back to the bakery. It is apparent that the collapsed carriers, if allowed to lie loosely about in the delivery truck, interfere with the removal of loaded carriers from the truck at subsequent delivery stops along the route, and considerable manual effort is required, upon the return of the delivery truck to the bakery, in order to gather together the loose collapsed carriers and remove the latter to the location within the bakery where they are reloaded.

Accordingly, it is an object of the present invention to effect the orderly storage of collapsed carriers of the described character in a delivery truck, warehouse or the like, and to provide for the transportation of the collapsed carriers from the storage locale to a point of use, such as, a reloading location, while avoiding individual handling of the collapsed carriers as much as is possible.

More specifically, an object of the invention is to provide a device, preferably in the form of a portable truck, which can be removably mounted in a delivery truck or the like to receive and support flattened articles, particularly collapsed carriers of the described character, in an orderly and compact storage stack so as to offer minimum interference with removal of loaded carriers from the truck, and which can be bodily removed from the truck, with the stack of collapsed carriers thereon, and moved, either on wheels with which it is provided or otherwise, from the returned delivery truck to the reloading location or to a storage area within the bakery.

A further object is to provide a portable carrier storage truck of the described character which is relatively light in weight and simple in construction while having sufficient strength and rigidity to serve the purposes for which it is intended, and wherein the structure of the portable truck is arranged to discourage the use thereof for any but its intended purposes thereby to deter misappropriation of the portable trucks.

In order that the invention may be clearly understood, an illustrative embodiment thereof is hereinafter described in detail, merely by way of example, and shown in the accompanying drawing forming a part hereof and wherein:

Fig. 1 is a perspective view of a portable carrier storage truck embodying the present invention;

Fig. 2 is a fragmentary, longitudinal sectional view of the head portion of the truck shown in Fig. 1, but on an enlarged scale, with the portable truck shown suspended from a supporting bracket and having collapsed carriers thereon;

Fig. 3 is an elevational view, on a reduced scale, showing the portable truck of Fig. 1 with collapsed carriers thereon and being rolled in an inclined position;

Fig. 4 is a view similar to Fig. 3, but showing the loaded portable truck in a substantially horizontal position; and Fig. 5 is a perspective view of a carrier of the kind intended to be transported and stored on portable trucks embodying this invention with the illustrated carrier being shown in its open position for receiving tubular receptacles containing articles to be delivered.

Referring to the drawing in detail, and initially to Figs. 1 and 2 thereof, a portable carrier storage truck embodying the present invention is there illustrated and generally identified by the reference numeral 10. The portable truck 10 includes an elongated planar frame, generally identified by the reference numeral 11, which is preferably formed of two longitudinally extending frame members 12 and 13 having their opposite end portions in spaced apart and parallel relationship and diverging between those end portions in the direction away from the head end of the frame. The relatively greatly spaced apart ends of frame members 12 and 13 are connected by a cross-tie 14, which may be integral with the related ends of the longitudinal frame members, and by a spreader 15 which is parallel to, and spaced from, cross-tie 14 and secured at its opposite ends, as by welding, to the members 12 and 13. An intermediate spreader 16 extends between frame members 12 and 13 at a location intermediate the lengths of the latter, and a cross-member 17 extends between the longitudinal frame members at a location adjacent the relatively close together ends of the latter, that is, adjacent the head end of frame 11. As seen in Fig. 1, longitudinal frame members 12 and 13, cross-tie 14, and spreaders 15 and 16 are preferably formed of relatively flat bar stock having the major axis of its cross-sectional area extending normal to the plane of the frame to best withstand the load of collapsed carriers supported against the frame as hereinafter described in detail, and cross-member 17 is also formed of flat bar stock but with the major axis of its cross-sectional area turned parallel to the plane of the frame.

An axle 18 passes through the relatively widely spaced apart ends of frame members 12 and 13 at a location between cross-tie 14 and spreader 15 and at its opposite ends rotatably supports wheels or rollers 19 for rolling upon a supporting surface or floor. A caster or swiveling roller or wheel 20 is mounted on cross-member 17 for rolling upon a supporting surface or floor when the frame is substantially parallel to that surface, that is, when the frame is substantially horizontally disposed on a level floor, as in Fig. 4.

A structure, preferably formed of a bent rod and generally identified by the reference numeral 21, is secured, as by welding, to the relatively close together ends of frame members 12 and 13 at the head end of the frame and defines a carrier holding member and a handle. The bent rod structure 21 includes a relatively long U-shaped loop 22 and a relatively short U-shaped loop 23 having its side portions spaced from, and substantially parallel to, the side portions of loop 22 with the ends of loops 22 and 23 being connected by integral bent portions 24. The bent portions 24 connecting the ends of loops 22 and 23 are disposed against the outer sides of the frame members 12 and 13 and are there welded to the latter, with the loops 22 and 23 extending from the side of frame 11 opposite to the side at which caster 20 is disposed. As will be hereinafter described in detail, loop 22 forms a carrier holding member, while loop 23 provides a handle and preferably has its cross or bight portion 25 (Figs. 1 and 2) offset in the direction away from loop 22 to facilitate grasping of the handle or engagement of the latter by a conveyor hook even when collapsed carriers are held on the holding member 22.

The portable carrier storage truck 10 is completed by an angle member 26 which is welded between the bent portions 24 of rod structure 21 at the same side of the frame as caster 20 and has one of its flanges extending in the direction substantially normal to the plane of frame 11 with the caster 20 extending beyond the free edge of said one flange in that direction so that, when the truck 10 is supported in a flat or horizontal position on the wheels 19 and the caster or swiveling wheel 20 (Fig. 4), the angle member 26 is clear of the supporting surface.

The portable truck 10 is adapted for the transportation and storage of flattened articles having openings at least at one end, with the flattened articles being placed in a stack against frame 11 so that holding member 22 extends through the openings at one end of the articles. Specifically, the portable truck 10 is intended for use in transporting and storing collapsible carriers employed in the distribution and handling of bulky, easily crushed products or fragile articles, for example, bakery products such as loaves of bread, pies, packaged rolls or other soft goods. Such collapsible carriers are described in detail in the co-pending application, Serial No. 297,627, filed July 8, 1952, now Patent No. 2,765,111, but for the purposes of understanding the functioning of the portable truck 10 embodying the present invention a typical collapsible carrier 27 of the described character is shown in Fig. 5 and can there be seen to be made as largely open frameworks of hinged panel and link members formed of suitably rigid metal wire. The open frameworks of hinged panel and link members making up the collapsible carrier 27 include top and bottom panel members 28 and 29, respectively, and an interconnecting rigid back panel member 30 hinged to the back ends of panel members 28 and 29, with interconnecting lateral link members 31 and 32 hinged to the top and bottom panel members in parallel relation to back panel member 30 so as to leave the front end of the carrier open for receiving a stack of collapsible tubular receptacles or other elongated articles slidably projected into the carrier. A wire bail 33 is hingedly connected to the front end of top panel member 28 to provide a handle. The carrier thus constitutes a freely deformable structure which can assume or be deformed easily to any desired angular position between a fully open position (Fig. 5) in which its meeting sides are substantially square to each other and a fully collapsed position in which they lie nearly parallel to each other. When the carriers are in their fully collapsed position, the collapsed carriers can be placed successively in a stack against the frame 11 of the portable carrier storage truck 10 with the carrier holding member 22 extending through the carrier handles 33 (Fig. 2).

When employing collapsible carriers of the type described above for the distribution and handling of bulky or easily crushed products, for example, bakery products, the carrier is held in its open position by fitting elongated articles, such as, tubular bakery product receptacles, therein through the open front side of the carrier. The loaded carriers are then stacked within the body of a delivery truck for distribution to the food markets, restaurants or other places where they are to be consumed or resold. At the stops along the delivery route, tubular bakery product receptacles are removed from the carriers and, as the successive carriers are emptied, they are collapsed for return to the bakery. In order to avoid cluttering of the interior of the delivery truck with collapsed carriers which might interfere with the further removal of loaded carriers, a bracket, preferably in the form of an angle member 34 (Fig. 2), is mounted upon a side wall of the delivery truck so that the portable truck 10 can be vertically suspended from angle member 34 by resting the flange of angle member 26 on the latter, whereby the successively collapsed carriers 27 can be supported from their handles 33 upon carrier holding member 22 in a compact and orderly stack against the portable truck frame. Preferably, a removable pin 35 is passed through registering openings in the angle members 26 and 34 to retain the latter in engagement with each other. Further, as seen in Figs. 2, 3 and 4, the carrier holding member 22 is preferably inclined relative to the perpendicular to frame 11 in the direction toward the head end of the frame so that, when the portable carrier storage truck is vertically suspended, as in Fig. 2, collapsed carriers supported by their handles from carrier holding members 22 are gravitationally induced to slide along the latter in the direction toward frame 11 to form a compact stack against the latter and to resist inadvertent removal of handles 33 from engagement with member 22.

When the delivery truck has completed its route and returns to the bakery, a stack of the emptied and collapsed carriers is stored on each portable truck 10 and the latter is removed from its vertically suspended position, with the collapsed carriers thereon, and transported, in any of a variety of ways, from the returned delivery truck to the location within the bakery where the collapsed carriers are to be reloaded with products for delivery, or to a storage area where the collapsed carriers can be stored on the portable truck for future delivery to the reloading location. Such transportation of portable truck 10 with a stack of collapsed carriers thereon can be effected in an inclined position with wheels 19 rolling on a supporting surface and with the head end of the truck elevated, as shown in Fig. 3, for example, by manual support at the handle 23, or the portable truck can be disposed flat or horizontally, as shown in Fig. 4, with wheels 19 and caster 20 rolling on the supporting surface. Further, if desired, an overhead conveyor (not shown) having depending conveyor hooks may be provided between spaced locations or departments in the bakery so that the portable trucks, with or without stacks of collapsed carriers thereon, can be suspended by their handles 23 from the overhead conveyor hooks to be automatically transported through the bakery. In this connection, the cross portion 25 of the handle 23 is preferably disposed in approximate vertical alignment with the center of gravity of the portable truck in its loaded condition to avoid excessive tilting of the portable truck when it is suspended from an overhead conveyor hook.

From the foregoing it is apparent that a portable truck embodying the present invention provides a convenient support for storing the collapsed carriers of the described character, or other similar flattened articles, in a compact and orderly stack, for example, against a wall of the body of a delivery truck, and also serves to transport the stacked carriers, for example, from a returned delivery truck, thereby avoiding individual handling of the collapsed carriers.

While a particular embodiment of the invention has been described in detail and illustrated in the accompanying drawing, it is to be understood that the invention is not limited to that particular embodiment, and that various changes and modifications can be effected therein without departing from the scope of the invention as defined in the appended claims.

What is claimed is:

1. A portable carrier storing truck comprising a frame including laterally spaced part, longitudinally extending frame members lying in a flat plane and diverging toward one end of the frame, wheels rotatably mounted on said longitudinal frame members at least at said one end of the frame for rolling on a support surface, an elongated U-shaped member extending upwardly and away from said longitudinal frame members at the other end of said frame to one side of said flat plane to pass through open portions of carriers arranged in a stack against said longitudinal frame members for holding the carriers on said frame, and a substantially U-shaped handle integral with said U-shaped member at its ends and longitudinally spaced from said U-shaped member along a substantial portion of the length of said handle to permit grasping of the latter for supporting said other end of the frame in elevated position during rolling of said wheels on a support surface.

2. A portable truck for storing and carrying flattened articles having openings extending therethrough at least at one end; said truck comprising an elongated frame defining an elongated support for a stack of the articles at least at one side thereof, wheels mounted on said frame at one end of the latter for rolling on a support surface, an elongated U-shaped article holding member extending upwardly and away from the other end of said frame at said one side of the latter for extension through the openings of flattened articles stacked against said flat plane, a substantially U-shaped handle integral with said U-shaped member at its ends, extending from said other end of the frame at said one side of the latter and spaced from said article holding member to provide for elevated support of said frame at said other end, means extending from said other end of said frame at the other side of the latter for vertically suspending said frame, and additional rolling means mounted on said frame adjacent said other end of the latter and extending from said other side beyond said suspending means so that said frame can roll in a substantially horizontal position on said wheels and said rolling means.

3. A portable truck for storing collapsed carriers of the described character; said portable truck comprising a substantially flat frame defining an elongated support for a stack of the carriers, said frame being defined by substantially straight longitudinal members which converge toward a head end thereof and having wheels rotatably mounted on a tail end thereof for rolling on a support surface, a U-shaped carrier holding member projecting from the head end of said frame to one side thereof at an angle thereto and being sloped away from a plane transverse to a medial part of the frame, said holding member being formed to extend through open portions of and thus impale collapsed carriers to hold the carriers in a stack against said frame, said frame being substantially unobstructed along its bottom and around its tail end and along its upper side to the region of said holding member, and a handle extending from said head end of the frame to said one side thereof in spaced relation to said holding member, whereby the frame with a stack of carriers thereon may be disposed manually in any of a plurality of positions including a horizontal position on such surface and in any angular relation to said surface with the assembly resting on said wheels.

4. A portable truck for storing collapsed carriers of the described character; said portable truck comprising a substantially flat frame defining an elongated support for a stack of the carriers, said frame being defined by substantially straight longitudinal members which converge toward a head end thereof and having wheels rotatably mounted on a tail end thereof for rolling on a support surface, a U-shaped carrier holding member projecting from the head end of said frame to one side thereof at an angle thereto and being sloped away from a plane transverse to a medial part of the frame, said holding member being formed to extend through open portions of and thus impale collapsed carriers to hold the carriers in a stack against said frame, said frame being substantially unobstructed along its bottom and around its tail end and along its upper side to the region of said holding member, and a handle extending from said head end of the frame to said one side thereof in spaced relation to said holding member, whereby the frame with a stack of carriers thereon may be disposed manually in any of a plurality of positions including a horizontal position on such surface and in any angular relation to said surface with the assembly resting on said wheels, and means extending from the other side of said head end of the frame for suspending said frame in an upright position on an elevated supporting member.

References Cited in the file of this patent

UNITED STATES PATENTS

| | | |
|---|---|---|
| D. 157,589 | Hartenbach | Mar. 7, 1950 |
| 726,406 | Colestock | Apr. 28, 1903 |
| 1,055,933 | McCoy | Mar. 11, 1913 |
| 1,716,611 | Wilson | June 11, 1929 |
| 2,288,622 | Heigis | July 7, 1942 |
| 2,470,040 | Makin et al. | May 10, 1949 |
| 2,606,770 | Reichert | Aug. 12, 1952 |

FOREIGN PATENTS

| | | |
|---|---|---|
| 930,850 | France | Sept. 1, 1947 |